US012624266B2

(12) United States Patent
Usui et al.

(10) Patent No.: US 12,624,266 B2
(45) Date of Patent: May 12, 2026

(54) USE OF COMPOSITION AS REFRIGERANT IN COMPRESSOR, COMPRESSOR, AND REFRIGERATION CYCLE APPARATUS

(71) Applicant: DAIKIN INDUSTRIES, LTD., Osaka (JP)

(72) Inventors: Takashi Usui, Osaka (JP); Tomoyuki Gotou, Osaka (JP); Takashi Yoshimura, Osaka (JP); Yuuko Itou, Osaka (JP); Yuka Watanabe, Osaka (JP); Takuma Iwasaka, Osaka (JP); Youhei Takakura, Osaka (JP); Yuuki Yotsumoto, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 664 days.

(21) Appl. No.: 18/095,595

(22) Filed: Jan. 11, 2023

(65) Prior Publication Data

US 2023/0159810 A1 May 25, 2023

Related U.S. Application Data

(63) Continuation of application No. PCT/JP2021/025498, filed on Jul. 6, 2021.

(30) Foreign Application Priority Data

Jul. 15, 2020 (JP) ................................. 2020-121383

(51) Int. Cl.
C09K 5/04 (2006.01)
(52) U.S. Cl.
CPC ........ C09K 5/045 (2013.01); *C09K 2205/126* (2013.01)

(58) Field of Classification Search
CPC ................................................ C09K 2205/126
See application file for complete search history.

(56) References Cited

U.S. PATENT DOCUMENTS

| | | | |
|---|---|---|---|
| 2017/0108247 A1 | 4/2017 | Sata et al. | |
| 2019/0032971 A1 | 1/2019 | Ishida et al. | |
| 2021/0163381 A1 | 6/2021 | Komatsu | |

FOREIGN PATENT DOCUMENTS

| | | |
|---|---|---|
| JP | 2017-133827 A | 8/2017 |
| JP | 2019-196312 A | 11/2019 |
| WO | WO 2015/136981 A1 | 9/2015 |
| WO | WO 2015/140871 A1 | 9/2015 |

(Continued)

OTHER PUBLICATIONS

Extended European Search Report for European Application No. 21841811.9, dated Jun. 19, 2024.

(Continued)

*Primary Examiner* — Peter F Godenschwager
(74) *Attorney, Agent, or Firm* — Birch, Stewart, Kolasch & Birch, LLP

(57) ABSTRACT

The propagation of a disproportionation reaction of a refrigerant is suppressed. Disclosed is a method of using a composition as a refrigerant in a compressor, in which the composition includes one or more compounds selected from the group of ethylene-based fluoroolefins, 2,3,3,3-tetrafluoropropene, and 1,3,3,3-tetrafluoropropene, and the dimension of a gap of a predetermined portion through which the refrigerant flows around an ignition energy generation portion in the compressor is less than or equal to 2 mm.

2 Claims, 5 Drawing Sheets

(56) References Cited

FOREIGN PATENT DOCUMENTS

| | | | |
|---|---|---|---|
| WO | WO 2015/140873 | A1 | 9/2015 |
| WO | WO 2016/139735 | A1 | 9/2016 |
| WO | WO 2017/141825 | A1 | 8/2017 |

OTHER PUBLICATIONS

International Search Report (PCT/ISA/210), issued in PCT/JP2021/025498, dated Sep. 7, 2021.
International Preliminary Report on Patentability and Written Opinion of the International Searching Authority for International Application No. PCT/JP2021/025498, dated Jan. 26, 2023.

USE OF COMPOSITION AS REFRIGERANT IN COMPRESSOR, COMPRESSOR, AND REFRIGERATION CYCLE APPARATUS

CROSS REFERENCE TO RELATED APPLICATIONS

This application is a Continuation of PCT International Application No. PCT/JP2021/025498, filed on Jul. 6, 2021, which claims priority under 35 U.S.C. 119(a) to Patent Application No. JP 2020-121383, filed in Japan on Jul. 15, 2020, all of which are hereby expressly incorporated by reference into the present application.

TECHNICAL FIELD

The present disclosure relates to the use of a composition as a refrigerant in a compressor, the compressor, and a refrigeration cycle apparatus.

BACKGROUND ART

Conventionally, hydrofluoroolefins (HFO refrigerants) having lower global warming potential (hereinafter also simply referred to as GWP) than HFC refrigerants have attracted attention for refrigeration apparatuses. For example, 1,2-difluoroethylene (HFO-1132) is considered as a refrigerant with low GWP in Patent Literature 1 (Japanese Patent Laid-Open No. 2019-196312).

SUMMARY

The use of a composition as a refrigerant in a compressor according to a first aspect is the use of a composition as a refrigerant in a compressor in which the dimension of a gap of a predetermined portion in the compressor is less than or equal to 2 mm. The predetermined portion is a portion through which the refrigerant flows around an ignition energy generation portion in the compressor. The composition includes one or more compounds selected from the group consisting of ethylene-based fluoroolefins, 2,3,3,3-tetrafluoropropene (HFO-1234yf), and 1,3,3,3-tetrafluoropropene (HFO-1234ze).

DESCRIPTION OF EMBODIMENTS

Hereinafter, a compressor, a refrigeration cycle apparatus, and the use of a composition as a refrigerant in such a compressor or an apparatus will be specifically described with reference to examples. However, the following description is not intended to limit the present disclosure.

(1) Refrigeration Cycle Apparatus 1

A refrigeration cycle apparatus 1 is an apparatus for performing vapor-compression refrigeration cycles to process a heat load of a target space. For example, the refrigeration cycle apparatus 1 is an air-conditioning apparatus for conditioning air in a target space.

Figure 1:
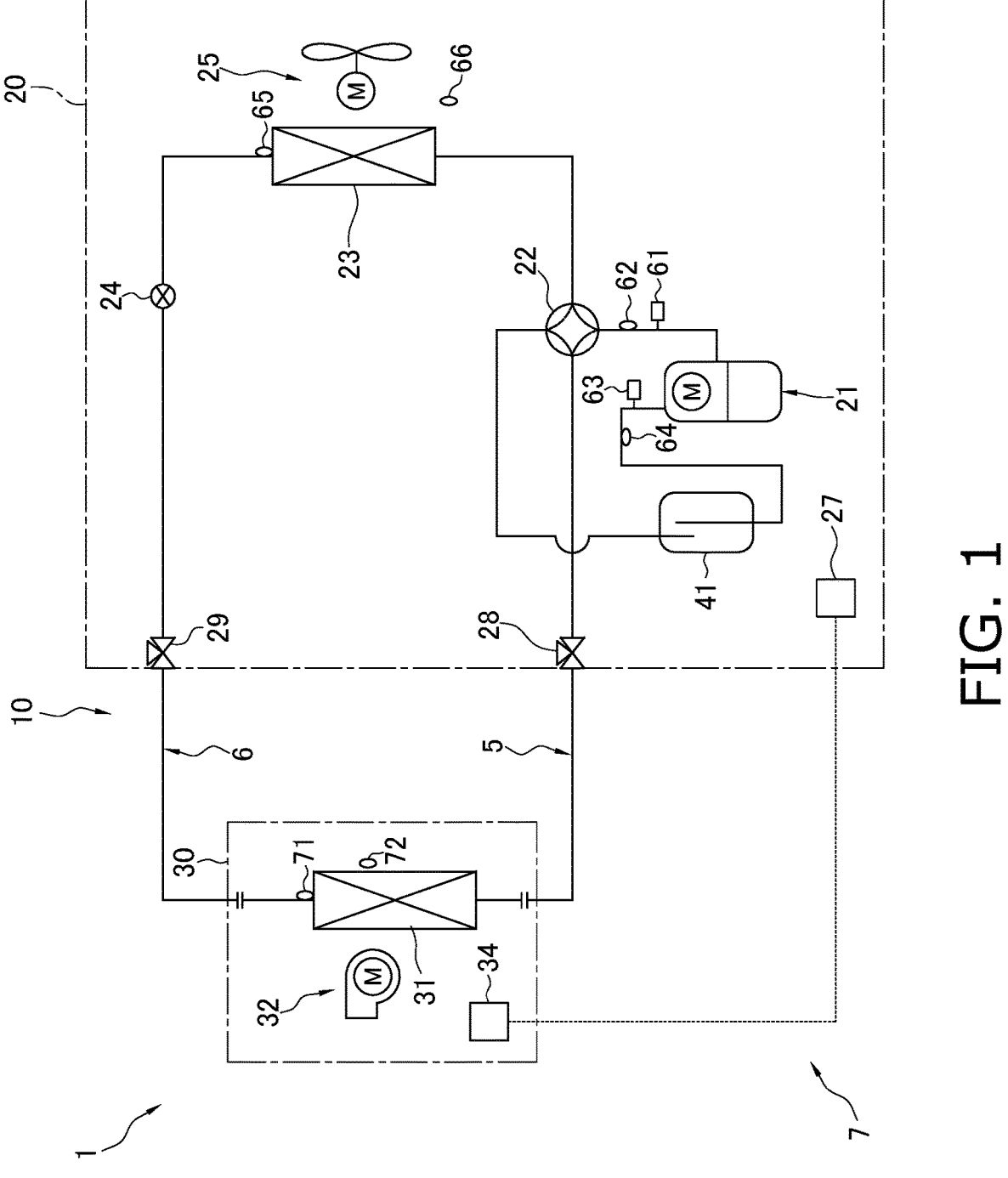
FIG. 1 is a schematic configuration diagram of a refrigeration cycle apparatus.
Figure 2:
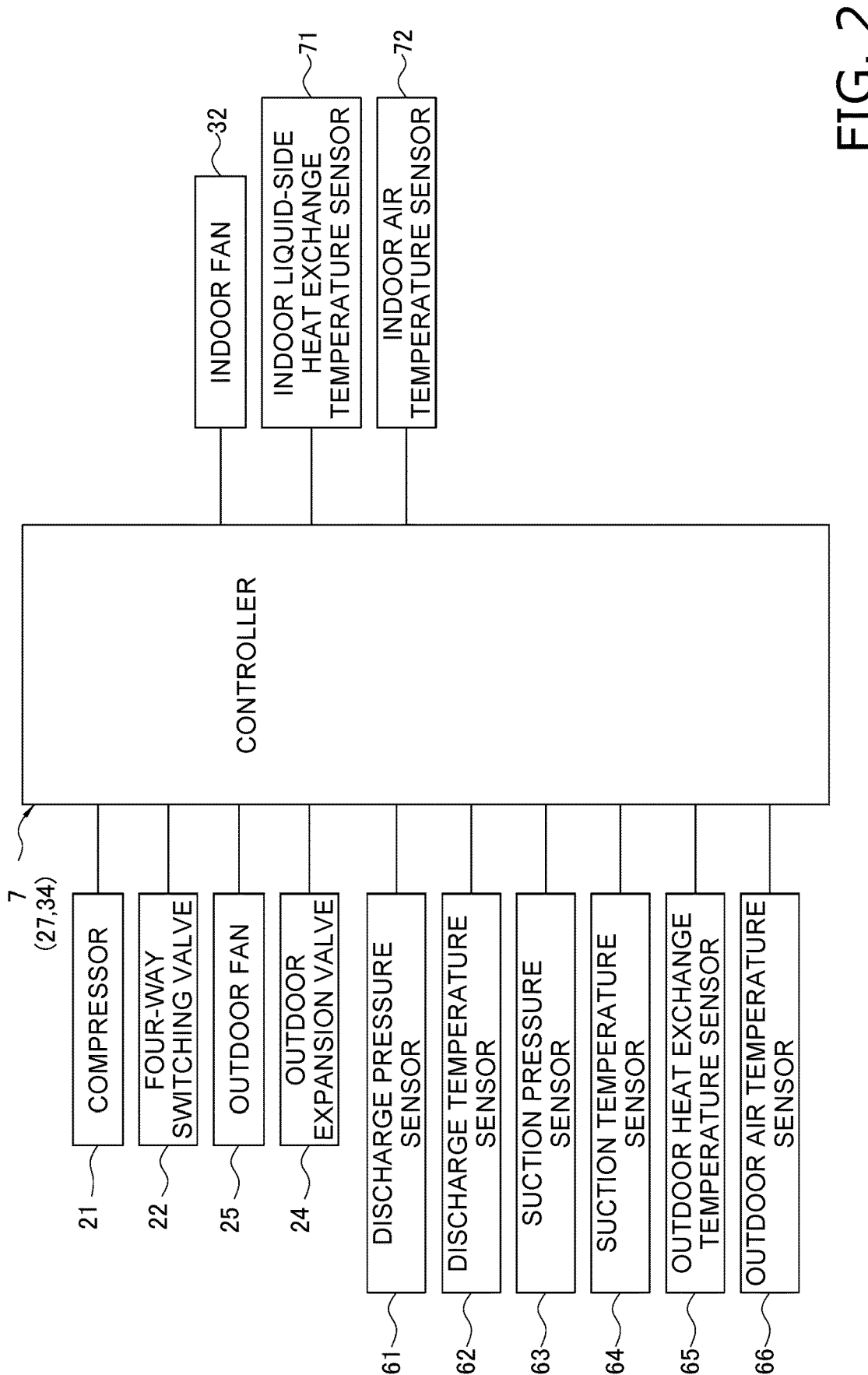
FIG. 2 is a block configuration diagram of the refrigeration cycle apparatus.

FIG. 1 is a schematic configuration diagram of the refrigeration cycle apparatus. FIG. 2 is a block configuration diagram of the refrigeration cycle apparatus.

The refrigeration cycle apparatus 1 mainly includes an outdoor unit 20; an indoor unit 30; a liquid-side refrigerant communication pipe 6 and a gas-side refrigerant communication pipe 5 each connecting the outdoor unit 20 and the indoor unit 30; a remote controller (not illustrated); and a controller 7 that controls the operation of the refrigeration cycle apparatus 1.

In the refrigeration cycle apparatus 1, refrigeration cycles are performed such that a refrigerant enclosed in a refrigerant circuit 10 is compressed, and is then cooled or condensed, and is then decompressed, and is then heated or evaporated, and is then compressed again. In the present embodiment, the refrigerant circuit 10 is filled with a refrigerant for performing vapor-compression refrigeration cycles.

(2) Refrigerant

Examples of the refrigerant filling the refrigerant circuit 10 include one or more compounds selected from the group consisting of ethylene-based fluoroolefins, 2,3,3,3-tetrafluoropropene (HFO-1234yf), and 1,3,3,3-tetrafluoropropene (HFO-1234ze). Note that regarding the burning velocity defined by the ISO 817, 1,3,3,3-tetrafluoropropene (HFO-1234ze) with a burning velocity of 1.2 cm/s is more preferable than 2,3,3,3-tetrafluoropropene (HFO-1234yf) with a burning velocity of 1.5 cm/s. Regarding the LFL (Lower Flammability Limit) defined by the ISO 817, 1,3,3,3-tetrafluoropropene (HFO-1234ze) with a LFL of 65000 vol·ppm or 6.5% is more preferable than 2,3,3,3-tetrafluoropropene (HFO-1234yf) with a LFL of 62000 vol·ppm or 6.2%. In particular, the refrigerant may include one or more compounds selected from the group consisting of 1,2-difluoroethylene (HFO-1132), 1,1-difluoroethylene (HFO-1132a), 1,1,2-trifluoroethylene (HFO-1123), monofluoroethylene (HFO-1141), and perhaloolefins. Above all, the refrigerant, including 1,2-difluoroethylene (HFO-1132) and/or 1,1,2-trifluoroethylene (HFO-1123), is preferable.

Herein, examples of ethylene-based fluoroolefins include 1,2-difluoroethylene (HFO-1132), 1,1-difluoroethylene (HFO-1132a), 1,1,2-trifluoroethylene (HFO-1123), monofluoroethylene (HFO-1141), and perhaloolefins. Examples of perhaloolefins include chlorotrifluoroethylene (CFO-1113) and tetrafluoroethylene (FO-1114).

Note that the refrigerant circuit 10 is also filled with refrigerator oil together with the aforementioned refrigerant.

(3) Outdoor Unit 20

The outdoor unit 20 is connected to the indoor unit 30 via the liquid-side refrigerant communication pipe 6 and the gas-side refrigerant communication pipe 5, and consists part of the refrigerant circuit 10. The outdoor unit 20 mainly includes a compressor 21, a four-way switching valve 22, an outdoor heat exchanger 23, an outdoor expansion valve 24, an outdoor fan 25, a receiver 41, a gas-side shut-off valve 28, and a liquid-side shut-off valve 29.

The compressor 21 is a device that compresses a low-pressure refrigerant in a refrigeration cycle up to a high pressure. Herein, the compressor 21 may be a hermetic compressor in which a rotary-type or scroll-type positive-displacement compression element is rotationally driven by a compressor motor. In the present embodiment, a rotary compressor is used. The compressor motor is used to change the volume, and its operating frequency can be controlled with an inverter.

The four-way switching valve 22 switches a flow channel of the refrigerant circuit 10. Specifically, the four-way switching valve 22 can switch between a state in which the discharge side of the compressor 21 and the outdoor heat exchanger 23 are connected and the suction side of the compressor 21 and the gas-side shut-off valve 28 are connected and a state in which the discharge side of the compressor 21 and the gas-side shut-off valve 28 are connected and the suction side of the compressor 21 and the outdoor heat exchanger 23 are connected.

The outdoor heat exchanger 23 is a heat exchanger that functions as a radiator or a condenser for a high-pressure refrigerant in a refrigeration cycle during the cooling operation, and functions as an evaporator for a low-pressure refrigerant in a refrigeration cycle during the heating operation.

The outdoor expansion valve 24 is provided between the liquid-side outlet of the outdoor heat exchanger 23 and the liquid-side shut-off valve 29 in the refrigerant circuit 10. The outdoor expansion valve 24 is a motor-operated expansion valve with an adjustable opening degree.

The outdoor fan 25 produces an air flow for causing outdoor air to be sucked into the outdoor unit 20, and causing the sucked air to exchange heat with a refrigerant in the outdoor heat exchanger 23, and then causing the air to be discharged to the outside. The outdoor fan 25 is rotationally driven by an outdoor fan motor.

The receiver 41 is a refrigerant container that is provided between the suction side of the compressor 21 and one of connection ports of the four-way switching valve 22, and that can store an excess refrigerant in the refrigerant circuit 10 as a liquid refrigerant.

The liquid-side shut-off valve 29 is a manual valve disposed at a portion of the outdoor unit 20 connected to the liquid-side refrigerant communication pipe 6.

The gas-side shut-off valve 28 is a manual valve disposed at a portion of the outdoor unit 20 connected to the gas-side refrigerant communication pipe 5.

The outdoor unit 20 includes an outdoor unit controller 27 that controls the operation of each portion forming the outdoor unit 20. The outdoor unit controller 27 has a microcomputer including a CPU and a memory, for example. The outdoor unit controller 27 is connected to an indoor unit controller 34 of each indoor unit 30 via a communication line, and transmits and receives control signals, for example.

The outdoor unit 20 is provided with a discharge pressure sensor 61, a discharge temperature sensor 62, a suction pressure sensor 63, a suction temperature sensor 64, an outdoor heat exchange temperature sensor 65, and an outdoor air temperature sensor 66, for example. Each of such sensors is electrically connected to the outdoor unit controller 27, and transmits a detection signal to the outdoor unit controller 27. The discharge pressure sensor 61 detects the pressure of a refrigerant flowing through a discharge pipe that connects the discharge side of the compressor 21 and one of the connection ports of the four-way switching valve 22. The discharge temperature sensor 62 detects the temperature of the refrigerant flowing through the discharge pipe. The suction pressure sensor 63 detects the pressure of a refrigerant flowing through a suction pipe that connects the suction side of the compressor 21 and the receiver 41. The suction temperature sensor 64 detects the temperature of the refrigerant flowing through the suction pipe. The outdoor heat exchange temperature sensor 65 detects the temperature of a refrigerant flowing through the liquid-side outlet of the outdoor heat exchanger 23 on the side opposite to the side connecting to the four-way switching valve 22. The outdoor air temperature sensor 66 detects the temperature of outdoor air before it passes through the outdoor heat exchanger 23.

(4) Indoor Unit 30

The indoor unit 30 is disposed on an indoor wall surface or ceiling as a target space, for example. The indoor unit 30 is connected to the outdoor unit 20 via the liquid-side refrigerant communication pipe 6 and the gas-side refrigerant communication pipe 5, and consists part of the refrigerant circuit 10.

The indoor unit 30 includes an indoor heat exchanger 31 and an indoor fan 32.

The indoor heat exchanger 31 is connected on its liquid side to the liquid-side refrigerant communication pipe 6, and is connected on its gas side to the gas-side refrigerant communication pipe 5. The indoor heat exchanger 31 is a heat exchanger that functions as an evaporator for a low-pressure refrigerant in a refrigeration cycle during the cooling operation, and functions as a condenser for a high-pressure refrigerant in a refrigeration cycle during the heating operation.

The indoor fan 32 produces an air flow for causing indoor air to be sucked into the indoor unit 30, and causing the sucked air to exchange heat with a refrigerant in the indoor heat exchanger 31, and then causing the air to be discharged to the outside. The indoor fan 32 is rotationally driven by an indoor fan motor.

The indoor unit 30 includes the indoor unit controller 34 that controls the operation of each unit forming the indoor unit 30. The indoor unit controller 34 includes a microcomputer including a CPU and a memory, for example. The indoor unit controller 34 is connected to the outdoor unit controller 27 via the communication line, and transmits and receives control signals, for example.

The indoor unit 30 is provided with an indoor liquid-side heat exchange temperature sensor 71 and an indoor air temperature sensor 72, for example. Each of such sensors is electrically connected to the indoor unit controller 34, and transmits a detection signal to the indoor unit controller 34. The indoor liquid-side heat exchange temperature sensor 71 detects the temperature of a refrigerant flowing through the liquid-refrigerant-side outlet of the indoor heat exchanger 31. The indoor air temperature sensor 72 detects the temperature of indoor air before it passes through the indoor heat exchanger 31.

(5) Controller 7

In the refrigeration cycle apparatus 1, the outdoor unit controller 27 and the indoor unit controller 34 are connected via the communication line, thus consisting the controller 7 that controls the operation of the refrigeration cycle apparatus 1.

The controller 7 mainly includes a CPU (central processing unit) and a memory, such as ROM and RAM. Note that various processes and control performed by the controller 7 are implemented as the portions, which are included in the outdoor unit controller 27 and/or the indoor unit controller 34, function in an integrated manner.

(6) Operation Modes

The refrigeration cycle apparatus 1 can execute at least a cooling operation mode and a heating operation mode.

The controller 7 determines for example, whether the instruction indicates the cooling operation mode or the heating operation mode, based on an instruction received from the remote controller or the like, and executes the mode.

In the cooling operation mode, the operating frequency of the compressor 21 is controlled to control the volume so that the evaporating temperature of the refrigerant in the refrigerant circuit 10 reaches a target evaporating temperature, for example.

The gaseous refrigerant discharged from the compressor 21 is condensed in the outdoor heat exchanger 23 via the four-way switching valve 22. The refrigerant that has flowed through the outdoor heat exchanger 23 is decompressed while passing through the outdoor expansion valve 24.

The refrigerant decompressed in the outdoor expansion valve 24 flows through the liquid-side refrigerant communication pipe 6 via the liquid-side shut-off valve 29, and is then sent to the indoor unit 30. After that, the refrigerant evaporates in the indoor heat exchanger 31, and then flows into the gas-side refrigerant communication pipe 5. The refrigerant that has flowed through the gas-side refrigerant communication pipe 5 is sucked into the compressor 21 again via the gas-side shut-off valve 28, the four-way switching valve 22, and the receiver 41.

In the heating operation mode, the operating frequency of the compressor 21 is controlled to control the volume so that the condensation temperature of the refrigerant in the refrigerant circuit 10 reaches a target condensation temperature, for example.

The gaseous refrigerant discharged from the compressor 21 flows through the four-way switching valve 22 and the gas-side refrigerant communication pipe 5, and then flows into the gas-side end of the indoor heat exchanger 31 of the indoor unit 30 so that the refrigerant is condensed or is allowed to radiate heat in the indoor heat exchanger 31. The refrigerant, which has been condensed or has been allowed to radiate heat in the indoor heat exchanger 31, flows through the liquid-side refrigerant communication pipe 6, and then flows into the outdoor unit 20.

The refrigerant that has passed through the liquid-side shut-off valve 29 of the outdoor unit 20 is decompressed in the outdoor expansion valve 24. The refrigerant that has been decompressed in the outdoor expansion valve 24 evaporates in the outdoor heat exchanger 23, and is sucked into the compressor 21 again via the four-way switching valve 22 and the receiver 41.

(7) Detailed Configuration of Compressor 21

Figure 3:
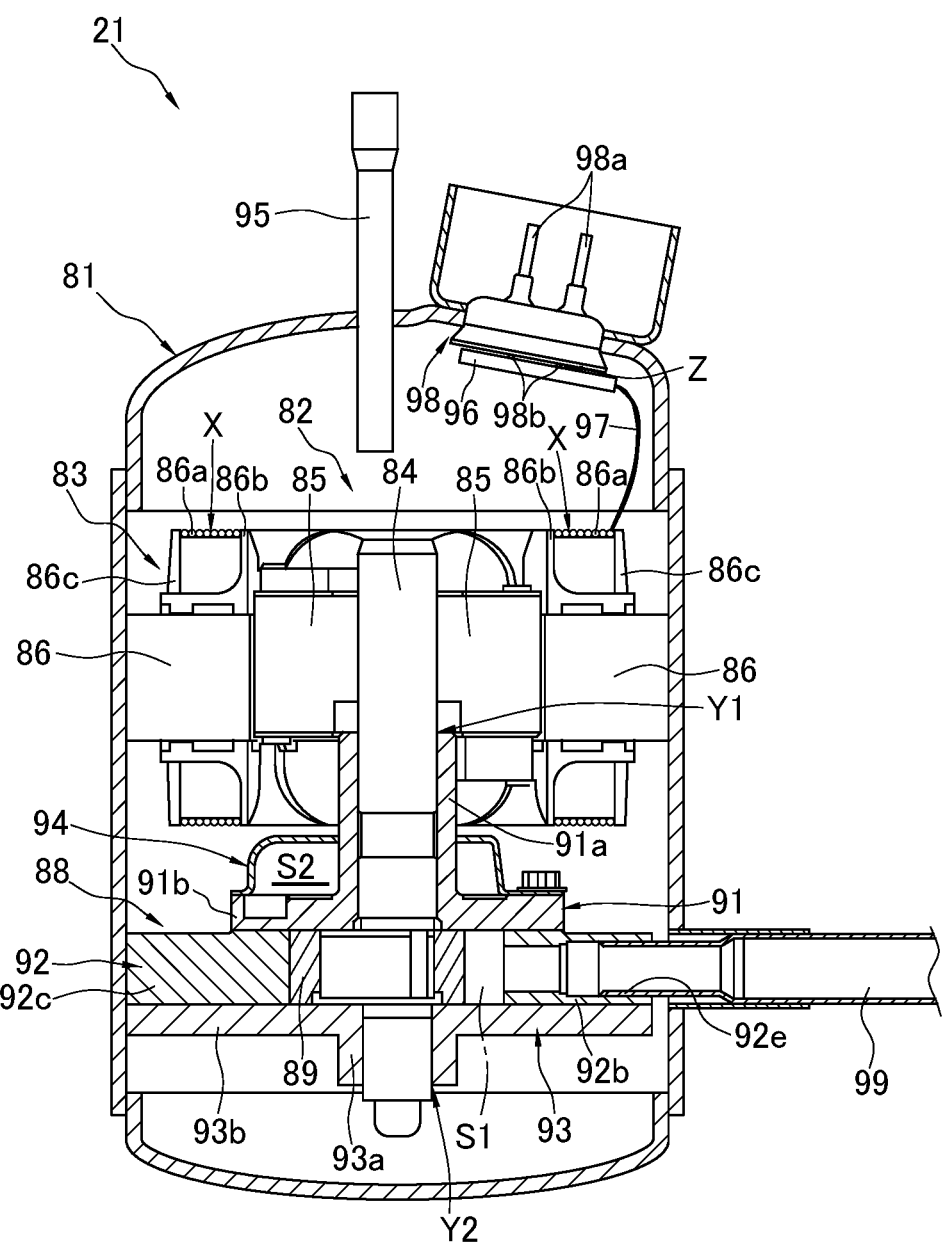
FIG. 3 is a side cross-sectional view illustrating a schematic configuration of a compressor.

The compressor 21 of the present embodiment is a one-cylinder rotary compressor as illustrated in FIG. 3, and is a rotary compressor including a casing 81 as well as a drive mechanism 82 and a compression mechanism 88 disposed in the casing 81. In the compressor 21, the compression mechanism 88 is disposed below the drive mechanism 82 in the casing 81.

(7-1) Drive Mechanism

The drive mechanism 82 is housed in the upper part of the internal space of the casing 81, and drives the compression mechanism 88. The drive mechanism 82 includes a motor 83 as a drive source, and a crankshaft 84 as a drive shaft attached to the motor 83.

The motor 83 is a motor for rotationally driving the crankshaft 84, and mainly includes a rotor 85 and a stator 86. The rotor 85 has the crankshaft 84 fit-inserted in its internal space, and rotates together with the crankshaft 84. The rotor 85 includes laminated electromagnetic steel plates and a magnet embedded in a rotor body. The stator 86 is disposed radially outward of the rotor 85 with a predetermined space from the rotor 85. The stator 86 is disposed while being divided into a plurality of sections at predetermined intervals in the circumferential direction. That is, the stator 86 includes a plurality of sections provided in the circumferential direction each including laminated electromagnetic steel plates and a coil 86a wound around a stator body 86c having teeth 86b. In the motor 83, the rotor 85 is caused to rotate together with the crankshaft 84 with an electromagnetic force that is generated in the stator 86 as a current is passed through the coil 86a.

Herein, the upper end of the casing 81 is provided with a terminal portion 98 for supplying power to the compressor 21 from outside. The coil 86a of the stator 86 is supplied with power via a cluster 96 as a connection member, which is connected to the terminal portion 98 from the inside of the casing 81, and an electric wire 97 extending from the cluster 96.

The terminal portion 98 includes, as terminal pins, a plurality of outer pins 98a extending to the outside of the casing 81, and a plurality of inner pins 98b extending to the inside of the casing 81. The cluster 96 has an approximately rectangular parallelepiped shape. The external profile of the cluster 96 is formed of resin. A face of the cluster 96 on the side of the terminal portion 98 is provided with portions for receiving the plurality of inner pins 98b of the terminal portion 98. In a state where the cluster 96 is coupled to the plurality of inner pins 98b of the terminal portion 98, a gap Z is produced between the face of the cluster 96 on the side of the terminal portion 98 and a root portion of the casing 81 from which the plurality of inner pins 98b extend. A refrigerant is present in the gap Z including a region around the plurality of inner pins 98b of the casing 81. The dimension of the gap Z in the direction in which the plurality of inner pins 98b of the casing 81 extend is less than or equal to 2.0 mm. The dimension of the gap Z is preferably less than or equal to 1.5 mm, and more preferably less than or equal to 1.0 mm. Note that, in a region of the gap Z around the inner pins 98b, the distance from the inner pins 98b in a direction perpendicular to the extension direction of the inner pins 98b is preferably greater than or equal to the dimension of the gap Z. In such a configuration, when the compressor 21 is supplied with power from outside while driven, a current flows through the plurality of outer pins 98a and the plurality of inner pins 98b of the terminal portion 98; the electric wire 97; and the coil 86a.

Figure 5:
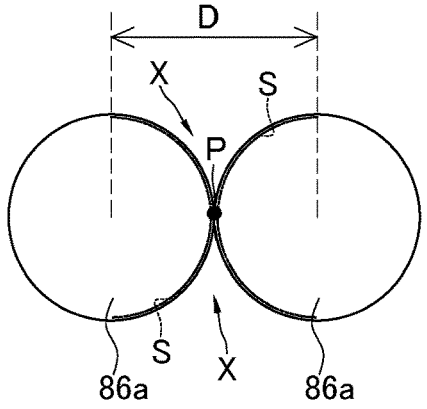
FIG. 5 is a schematic cross-sectional view illustrating the details of a region around adjacent portions of coils.

Each coil 86a has a cylindrical cross-sectional shape with an identical diameter as illustrated in a cross-sectional view along the axial direction of FIG. 5. The plurality of coils 86a are gathered such that their outer surfaces are in contact with each other at a contact point P. As indicated by the dotted lines on the rims in FIG. 5, the two coils 86_a_ that are in contact with each other at the contact point P have opposed faces S that are curved surfaces facing each other at a portion including the contact point P. Since the coils 86_a_ each have a cylindrical cross-sectional shape, the two coils 86_a_ that are in contact with each other have a gap X produced between their opposed faces S on opposite sides of the direction of the tangent to the contact point P in the cross-sectional view along the axial direction. The dimension of the gap X in the direction in which the centers of the two coils 86_a_ are arranged is less than or equal to 2.0 mm. The dimension of the gap X is preferably less than or equal to 1.5 mm, and more preferably less than or equal to 1.0 mm. Specifically, it is preferable that the maximum dimension of the gap X in the direction in which the centers of the two coils 86_a_ are arranged be less than or equal to 2.0 mm, the distance D between the centers of the two coils 86_a_ arranged in contact with each other be less than or equal to 2.0 mm, and the diameter of each coil 86_a_ be less than or equal to 2.0 mm. Note that the outer surface of each coil 86_a_ preferably has an insulating film.

Figure 4:
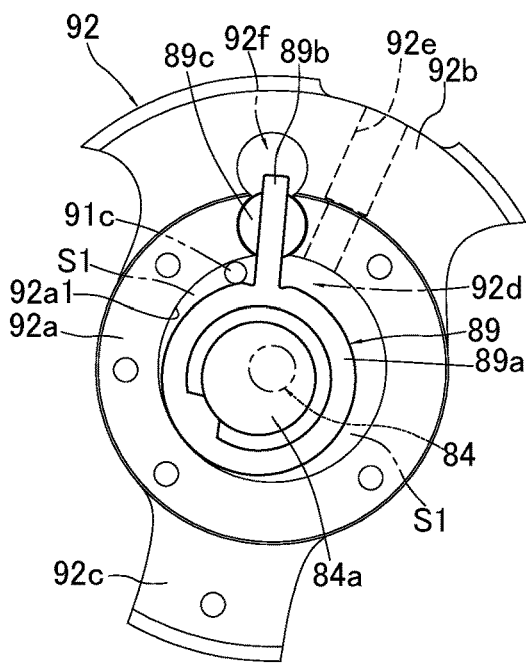
FIG. 4 is a plan cross-sectional view illustrating a region around a cylinder chamber of the compressor.

The crankshaft 84 is an approximately cylindrical member that is fit-inserted in the rotor 85, and rotates about the rotation axis. As illustrated in FIG. 4, a crankpin 84_a_, which is an eccentric portion of the crankshaft 84, is inserted through a roller 89_a_ (which is described below) of a piston 89 of the compression mechanism 88, and fits in the roller 89_a_ in a state where it can transmit torque from the rotor 85. The crankshaft 84 rotates with the rotation of the rotor 85, and eccentrically rotates the crankpin 84_a_, thus causing the roller 89_a_ of the piston 89 of the compression mechanism 88 to revolve. That is, the crankshaft 84 has a function of transmitting a drive force of the motor 83 to the compression mechanism 88.

(7-2) Compression Mechanism

The compression mechanism 88 is housed in the lower part of the casing 81. The compression mechanism 88 compresses a refrigerant sucked thereinto via a suction pipe 99. The compression mechanism 88 is a rotary compression mechanism, and mainly includes a front head 91, a cylinder 92, the piston 89, and a rear head 93. A refrigerant compressed in a compression chamber S1 of the compression mechanism 88 is discharged to a space in which the motor 83 is disposed and the lower end of a discharge pipe 95 is located from a front-head discharge hole 91_c_ formed in the front head 91 via a muffler space S2 surrounded by the front head 91 and a muffler 94.

(7-2-1) Cylinder

The cylinder 92 is a metal cast member. The cylinder 92 includes a cylindrical central portion 92_a_, a first extension portion 92_b_ extending radially outward from the central portion 92_a_ to one side, and a second extension portion 92_c_ extending from the central portion 92_a_ to a side opposite to the first extension portion 92_b_. The first extension portion 92_b_ has formed therein a suction hole 92_e_ for sucking a low-pressure refrigerant in a refrigeration cycle. A cylindrical space on the inner side of an inner peripheral face 92_a_1 of the central portion 92_a_ corresponds to a cylinder chamber 92_d_ into which a refrigerant sucked through the suction hole 92_e_ flows. The suction hole 92_e_ extends from the cylinder chamber 92_d_ to an outer peripheral face of the first extension portion 92_b_, and is open at the outer peripheral face of the first extension portion 92_b_. The suction hole 92_e_ has inserted therein the tip end portion of the suction pipe 99. In addition, the cylinder chamber 92_d_ houses the piston 89 for compressing a refrigerant that has flowed into the cylinder chamber 92_d_, for example.

The cylinder chamber 92_d_, which is formed by the cylindrical central portion 92_a_ of the cylinder 92, has at its lower end a first end that is open, and has at its upper end a second end that is open. The first end that is the lower end of the central portion 92_a_ is closed by the rear head 93 described below. The second end that is the upper end of the central portion 92_a_ is closed by the front head 91 described below.

The cylinder 92 has formed therein a blade oscillation space 92_f_ in which a bushing 89_c_ and a blade 89_b_ described below are disposed. The blade oscillation space 92_f_ is formed across a region from the central portion 92_a_ to the first extension portion 92_b_, and the blade 89_b_ of the piston 89 is oscillatably supported on the cylinder 92 via the bushing 89_c_. The blade oscillation space 92_f_ is formed to extend toward the outer periphery side from the cylinder chamber 92_d_ around the suction hole 92_e_ as seen in plan view.

(7-2-2) Front Head

As illustrated in FIG. 3, the front head 91 includes a front-head disc portion 91_b_ that closes the opening at the second end, which is the upper end, of the cylinder 92, and an upper bearing portion 91_a_ extending upward from the peripheral edge of the front-head opening in the center of the front-head disc portion 91_b_. The upper bearing portion 91_a_ is cylindrical and functions as a bearing for the crankshaft 84.

Figure 6:
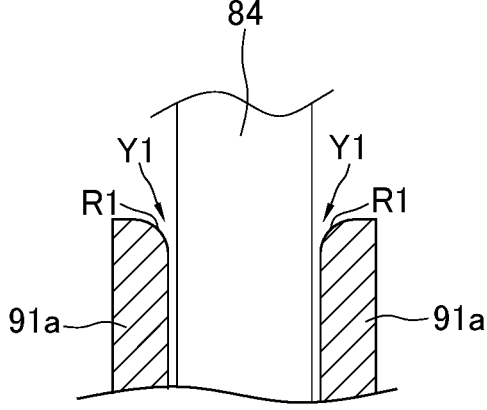
FIG. 6 is a schematic cross-sectional view illustrating the details of a region around a portion where a bearing portion and a crankshaft are adjacent to each other.
Figure 6:
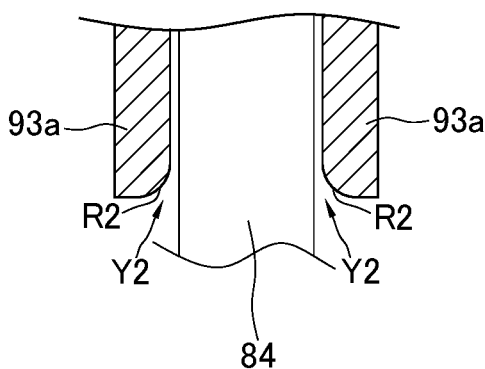

The inner peripheral face of the upper bearing portion 91_a_ and the outer peripheral face of the crankshaft 84 have a slight gap formed therebetween so as to allow the crankshaft 84 to rotate as illustrated in a side cross-sectional view of FIG. 6. The gap has lubricity as refrigerator oil is present in the gap. Herein, a portion around the upper end of the inner peripheral face of the upper bearing portion 91_a_ has formed thereon a curved surface R1 that expands radially outward more at positions closer to the upper end and is gently curved so as to protrude upward and inward as illustrated in FIG. 6. In this manner, providing the curved surface R1 can suppress the concentrated generation of frictional heat at the upper end of the inner peripheral face of the upper bearing portion 91_a_ while the crankshaft 84 is rotating. In addition, as the curved surface R1 is provided around the upper end of the inner peripheral face of the upper bearing portion 91_a_ in this manner, a gap Y1 is produced between the curved surface R1 and the outer peripheral face of the crankshaft 84 in the radial direction of the crankshaft 84. The dimension of the gap Y1 in the radial dimension of the crankshaft 84 from the outer peripheral face of the crankshaft 84 is designed to be less than or equal to 2.0 mm at maximum. The dimension of the gap Y1 is preferably less than or equal to 1.5 mm, and is more preferably less than or equal to 1.0 mm. Note that the dimension of the curved surface R1 in the longitudinal direction of the crankshaft 84 is preferably greater than or equal to the dimension of the gap Y1, for example.

The front-head disc portion 91_b_ has formed therein the front-head discharge hole 91_c_ at a plane position illustrated in FIG. 4. A refrigerant, which has been compressed in the compression chamber S1 having a variable volume in the cylinder chamber 92_d_ of the cylinder 92, is intermittently discharged through the front-head discharge hole 91_c_. The front-head disc portion 91*b* is provided with a discharge valve that opens or closes the outlet of the front-head discharge hole 91*c*. When pressure in the compression chamber S1 has become higher than pressure in the muffler space S2, the discharge valve is opened due to the pressure difference, thereby causing the refrigerant to be discharged to the muffler space S2 through the front-head discharge hole 91*c*.

(7-2-3) Muffler

As illustrated in FIG. 3, the muffler 94 is attached to the top face of the peripheral edge portion of the front-head disc portion 91*b* of the front head 91. The muffler 94 forms the muffler space S2 together with the top face of the front-head disc portion 91*b* and the outer peripheral face of the upper bearing portion 91*a*, and attempts to reduce noise generated along with the discharge of a refrigerant. The muffler space S2 and the compression chamber S1 communicate with each other via the front-head discharge hole 91*c* when the discharge valve is open as described above.

The muffler 94 has formed therein a central muffler opening (not illustrated) for passing the upper bearing portion 91*a*, and a muffler discharge hole (not illustrated) through which a refrigerant is flowed from the muffler space S2 to a housing space for the motor 83 above the muffler space S2.

Note that the muffler space S2, the housing space for the motor 83, the space where the discharge pipe 95 is located above the motor 83, and a space where lubricating oil accumulates below the compression mechanism 88, for example, are all continuous, and form a high-pressure space with equal pressure.

(7-2-4) Rear Head

The rear head 93 includes a rear-head disc portion 93*b* that closes the opening at the first end, which is the lower end, of the cylinder 92, and a lower bearing portion 93*a* as a bearing extending downward from the peripheral edge portion of the opening in the center of the rear-head disc portion 93*b*. The front-head disc portion 91*b*, the rear-head disc portion 93*b*, and the central portion 92*a* of the cylinder 92 form the cylinder chamber 92*d* as illustrated in FIG. 4. The lower bearing portion 93*a* axially supports the crankshaft 84 together with the aforementioned upper bearing portion 91*a*.

The inner peripheral face of the lower bearing portion 93*a* and the outer peripheral face of the crankshaft 84 have a slight gap formed therebetween so as to allow the crankshaft 84 to rotate as illustrated in the side cross-sectional view of FIG. 6. The gap has lubricity as refrigerator oil is present in the gap. Herein, a portion around the lower end of the inner peripheral face of the lower bearing portion 93*a* has formed thereon a curved surface R2 that expands radially outward more at positions closer to the lower end and is gently curved so as to protrude downward and inward as illustrated in FIG. 6. In this manner, providing the curved surface R2 can suppress the concentrated generation of frictional heat at the lower end of the inner peripheral face of the lower bearing portion 93*a* while the crankshaft 84 is rotating. In addition, as the curved surface R2 is provided around the lower end of the inner peripheral face of the lower bearing portion 93*a* in this manner, a gap Y2 is produced between the curved surface R2 and the outer peripheral face of the crankshaft 84 in the radial direction of the crankshaft 84. The dimension of the gap Y2 in the radial dimension of the crankshaft 84 from the outer peripheral face of the crankshaft 84 is designed to be less than or equal to 2.0 mm at maximum. The dimension of the gap Y2 is preferably less than or equal to 1.5 mm, and is more preferably less than or equal to 1.0 mm. Note that the dimension of the curved surface R2 in the longitudinal direction of the crankshaft 84 is preferably greater than or equal to the dimension of the gap Y2, for example.

(7-2-5) Piston

The piston 89 is disposed in the cylinder chamber 92*d*, and is attached to the crankpin 84*a* that is the eccentric portion of the crankshaft 84. The piston 89 is a member integrating the roller 89*a* and the blade 89*b*. The blade 89*b* of the piston 89 is disposed in the blade oscillation space 92*f* formed in the cylinder 92, and is oscillatably supported on the cylinder 92 via the bushing 89*c* as described above. The blade 89*b* is slidable on the bushing 89*c*, and oscillates and also repeatedly moves away from the crankshaft 84 and closer to the crankshaft 84 during operation.

As illustrated in FIG. 4, the roller 89*a* and the blade 89*b* of the piston 89 form the compression chamber S1, which has a volume variable with the revolution of the piston 89, such that the roller 89*a* and the blade 89*b* of the piston 89 partition the cylinder chamber 92*d*. The compression chamber S1 is a space surrounded by the inner peripheral face 92*a*1 of the central portion 92*a* of the cylinder 92, the top face of the rear-head disc portion 93*b*, the bottom face of the front-head disc portion 91*b*, and the piston 89. The volume of the compression chamber S1 changes with the revolution of the piston 89 so that a low-pressure refrigerant sucked thereinto through the suction hole 92*e* is compressed to become a high-pressure refrigerant, and is then discharged to the muffler space S2 through the front-head discharge hole 91*c*.

(7-3) Operation

In the foregoing compressor 21, the volume of the compression chamber S1 changes with the movement of the piston 89 of the compression mechanism 88 that revolves with the eccentric rotation of the crankpin 84*a*. Specifically, first, while the piston 89 starts revolving, a low-pressure refrigerant is sucked into the compression chamber S1 through the suction hole 92*e*. The volume of the compression chamber S1 facing the suction hole 92*e* gradually increases while it sucks the refrigerant. When the piston 89 further revolves, the communication state between the compression chamber S1 and the suction hole 92*e* is canceled so that the refrigerant starts to be compressed in the compression chamber S1. After that, the volume of the compression chamber S1 that communicates with the front-head discharge hole 91*c* becomes significantly small, and the pressure of the refrigerant therein increases. After that, as the piston 89 further revolves, the refrigerant with the increased pressure pushes and opens the discharge valve through the front-head discharge hole 91*c*, and thus is discharged to the muffler space S2. The refrigerant introduced into the muffler space S2 is discharged to a space above the muffler space S2 through the muffler discharge hole of the muffler 94. The refrigerant discharged to the outside of the muffler space S2 passes through a space between the rotor 85 and the stator 86 of the motor 83 to cool the motor 83, and is then discharged from the discharge pipe 95.

(8) Feature of Embodiment

In the refrigeration cycle apparatus 1 of the present embodiment, a refrigerant that may undergo a disproportionation reaction is used. Such a disproportionation reaction of the refrigerant occurs with a certain probability under an environment where predetermined high-temperature conditions, high-pressure conditions, and ignition energy conditions are satisfied. Then, the disproportionation reaction may propagate to surrounding regions from the portion where the disproportionation reaction has occurred.

In response, the inventors conducted a test of causing ignition by filling a pressure-resistant container with 1,2-difluoroethylene (HFO-1132) as a refrigerant, setting the refrigerant pressure in the pressure-resistant container to 1.0 MPa and the refrigerant temperature therein to 150° C., connecting two copper plates with a platinum wire in the pressure-resistant container, and applying a voltage across the plates to pass a current through the platinum wire. During the test, changes in the propagation of a disproportionation reaction were observed while changing the dimension of the gap between the plates. The test results demonstrate that the propagation of a disproportionation reaction occurs when the dimension of the gap between the plates is greater than or equal to 5.0 mm. The test results also demonstrate that the propagation of a disproportionation reaction does not occur when the dimension of the gap between the plates is less than or equal to 2.0 mm, and thus that the propagation of the disproportionation reaction is suppressed.

The compressor 21 for which the refrigerant of the present embodiment is used, and the refrigeration cycle apparatus 1 including such a compressor 21 are configured such that the dimension of the gap X between the coils 86a is less than or equal to 2.0 mm. Accordingly, even when a disproportionation reaction has occurred due to ignition energy generated as electric energy between the adjacent coils 86a during the operation of the compressor 21, the propagation of the disproportionation reaction to portions other than the coils 86a can be suppressed. In particular, in an operating state where the pressure of a refrigerant flowing through the discharge pipe 95 of the compressor 21 is greater than or equal to 1 MPa, the amount of current flowing through the coils 86a is large, which is likely to cause generation and propagation of a disproportionation reaction. However, the propagation of the disproportionation reaction can be suppressed even under such an operation condition. Note that even when the outer surface of each coil 86a is covered with an insulating film, ignition energy can be generated due to a current flow therethrough if the insulating film has a production defect or if the insulating film has peeled off due to friction between the adjacent coils 86a. However, the propagation of the disproportionation reaction is suppressed even in such a case.

In addition, the compressor 21 for which the refrigerant of the present embodiment is used, and the refrigeration cycle apparatus 1 including such a compressor 21 are configured such that the dimension of the gap Y1 between the crankshaft 84 and the curved surface R1 around the upper end of the upper bearing portion 91a is less than or equal to 2.0 mm. Accordingly, even when a disproportionation reaction has occurred due to ignition energy generated with frictional heat generated on the sliding surface between the crankshaft 84 and the upper bearing portion 91a during the operation of the compressor 21, the propagation of the disproportionation reaction to a region around the upper portion of the upper bearing portion 91a can be suppressed. This is also true of the gap Y2 between the crankshaft 84 and the curved surface R2 around the lower end of the lower bearing portion 93a. Specifically, even when a disproportionation reaction has occurred due to ignition energy generated with frictional heat generated on the sliding surface between the crankshaft 84 and the lower bearing portion 93a during the operation of the compressor 21, the propagation of the disproportionation reaction to a region around the lower portion of the lower bearing portion 93a can be suppressed. In particular, in an operating state where the pressure of a refrigerant flowing through the discharge pipe 95 of the compressor 21 is greater than or equal to 1 MPa, the number of revolutions of the crankshaft 84 is large, which is likely to cause generation and propagation of a disproportionation reaction. However, the propagation of the disproportionation reaction can be suppressed even under such an operation condition.

Further, the compressor 21 for which the refrigerant of the present embodiment is used, and the refrigeration cycle apparatus 1 including such a compressor 21 are configured such that the dimension of the gap Z between the terminal portion 98 and the cluster 96 is less than or equal to 2.0 mm. Accordingly, even when a disproportionation reaction has occurred due to ignition energy generated as electric energy from the inner pins 98b of the terminal portion 98 or from the connection portion between the inner pins 98b and the cluster 96, for example, during the operation of the compressor 21, the propagation of the disproportionation reaction to a region around the portion between the terminal portion 98 and the cluster 96 can be suppressed. In particular, in an operating state where the pressure of a refrigerant flowing through the discharge pipe 95 of the compressor 21 is greater than or equal to 1 MPa, the amount of power supplied to the terminal portion 98 is large, which is likely to cause generation and propagation of a disproportionation reaction. However, the propagation of the disproportionation reaction can be suppressed even under such an operation condition.

(9) Other Embodiments (9-1) Another Embodiment A

The foregoing embodiment has exemplarily illustrated a case where the propagation of a disproportionation reaction that has occurred in the gap X, the gap Y1, the gap Y2, or the gap Z in the compressor 21 is suppressed.

In contrast, a portion where a disproportionation reaction may occur in the compressor 21 is not limited thereto, and a disproportionation reaction can occur in any portion in the compressor 21 where predetermined high-temperature conditions, high-pressure conditions, and ignition energy conditions are satisfied during the operation of the compressor 21. Therefore, it is possible to, by setting the dimension of a gap of a portion through which a refrigerant flows around the portion where a disproportionation reaction can occur other than the aforementioned gap X, gap Y1, gap Y2, and gap Z to less than or equal to 2.0 mm, suppress the propagation of the disproportionation reaction from that portion.

(9-2) Another Embodiment B

The foregoing embodiment has exemplarily illustrated a case where the curved surface R1 is formed around the upper end of the inner peripheral face of the upper bearing portion 91a, and the curved surface R2 is formed around the lower end of the inner peripheral face of the lower bearing portion 93a.

In contrast, the specific shapes of the portion around the upper end of the inner peripheral face of the upper bearing portion 91a and the portion around the lower end of the inner peripheral face of the lower bearing portion 93a are not limited thereto. For example, the portion around the upper end of the inner peripheral face of the upper bearing portion 91a may have a structure obtained by chamfering the portion around the upper end of the inner peripheral face of the upper bearing portion 91a by forming an inclined surface that is inclined so as to be located radially outward of the crankshaft 84 more at positions closer to the upper end. Similarly, the portion around the lower end of the inner peripheral face of the lower bearing portion 93a may have a structure obtained by chamfering the portion around the lower end of the inner peripheral face of the lower bearing portion 93a by forming an inclined surface that is inclined so as to be located radially outward of the crankshaft 84 more at positions closer to the lower end.

(9-3) Another Embodiment C

The foregoing embodiment has exemplarily illustrated a case where a rotary compressor is used as the compressor 21.

In contrast, the compressor for suppressing the propagation of a disproportionation reaction by having a small gap of a predetermined portion through which a refrigerant flows around the ignition energy generation portion is not limited to a rotary compressor, and may be a known scroll compressor or swing compressor.

Others

Note that the dimension of the gap is more preferably less than or equal to 1 mm from the perspective of more efficiently suppressing the propagation of a disproportionation reaction.

Note also that the ignition energy generation portion in the compressor is not limited. For example, when the compressor includes a teeth and a coil wound around the teeth, the ignition energy generation portion may include the coil in the compressor. The gap in such a case may be a gap between opposed faces of adjacent wires of the coil.

In addition, when the compressor includes a crankshaft and a bearing portion that rotatably supports the crankshaft, for example, the ignition energy generation portion may include a portion where the crankshaft and the bearing portion are in contact with each other. The gap in such a case may be a gap between the crankshaft and the bearing portion.

Further, when the compressor includes a terminal pin and a connection member connected to the terminal pin in the compressor, for example, the ignition energy generation portion may include a portion where the inner face of the terminal pin and the connection member are in contact with each other, or a gap between them. The gap in such a case may be a gap between the inner face of the terminal pin and a face of the connection member facing the inner face of the terminal pin.

Note that 1,2-difluoroethylene may be trans-1,2-difluoroethylene [(E)-HFO-1132], cis-1,2-difluoroethylene [(Z)-HFO-1132], or a mixture of them.

Supplement

Although the embodiments of the present disclosure have been described above, it is to be understood that various changes to the forms or details are possible without departing from the spirit or scope of the present disclosure recited in the claims.

REFERENCE SIGNS LIST

1 Refrigeration cycle apparatus
10 Refrigerant circuit
21 Compressor
84 Crankshaft (ignition energy generation portion)
86a Coil (ignition energy generation portion)
91a Upper bearing portion (ignition energy generation portion)
93a Lower bearing portion (ignition energy generation portion)
95 Discharge pipe
96 Cluster (ignition energy generation portion)
97 Electric wire
98 Terminal portion (ignition energy generation portion)
98b Inner pins (ignition energy generation portion)
X Gap
Y1, Y2 Gaps
Z Gap

CITATION LIST

Patent Literature

[Patent Literature 1] Japanese Patent Laid-Open No. 2019-196312

The invention claimed is:

1. A compressor for compressing a refrigerant, the refrigerant comprising one or more compounds selected from the group consisting of ethylene-based fluoroolefins, 2,3,3,3-tetrafluoropropene, and 1,3,3,3-tetrafluoropropene, wherein:

a dimension of a gap of a predetermined portion through which the refrigerant flows around an ignition energy generation portion in the compressor is less than or equal to 2 mm.

2. A refrigeration cycle apparatus comprising a refrigerant circuit including the compressor of claim 1.

* * * * *